United States Patent
Chang et al.

(10) Patent No.: US 8,478,034 B2
(45) Date of Patent: Jul. 2, 2013

(54) METHOD AND SYSTEM FOR FOREGROUND DETECTION USING MULTI-MODALITY FUSION GRAPH CUT

(75) Inventors: Felix L. Chang, Taipei (TW); Winston H. Hsu, Nantou County (TW); Miao-Fen Chueh, Taipei (TW)

(73) Assignee: Institute for Information Industry, Taipei (TW)

( * ) Notice: Subject to any disclaimer, the term of this patent is extended or adjusted under 35 U.S.C. 154(b) by 1069 days.

(21) Appl. No.: 12/419,309

(22) Filed: Apr. 7, 2009

(65) Prior Publication Data

US 2010/0208987 A1 Aug. 19, 2010

(30) Foreign Application Priority Data

Feb. 16, 2009 (TW) .................................. 98104859

(51) Int. Cl.
*G06K 9/00* (2006.01)
*G06K 9/34* (2006.01)

(52) U.S. Cl.
USPC ........... 382/165; 382/173; 382/190; 382/103; 382/239; 375/204.12; 375/240.16; 713/180; 713/182; 713/186

(58) Field of Classification Search
USPC ................. 382/173, 180, 103, 164, 165, 190, 382/118, 160, 225, 199; 713/180, 186, 182; 375/240.12, 240.16
See application file for complete search history.

(56) References Cited

U.S. PATENT DOCUMENTS

| | | | |
|---|---|---|---|
| 7,207,068 B2 * | 4/2007 | Chaudhari et al. | 726/27 |
| 7,613,321 B2 * | 11/2009 | Altherr et al. | 382/103 |
| 7,706,610 B2 * | 4/2010 | Zhang et al. | 382/173 |
| 7,792,672 B2 * | 9/2010 | Rosec et al. | 704/246 |
| 8,103,093 B2 * | 1/2012 | Blake et al. | 382/164 |
| 8,116,538 B2 * | 2/2012 | Kim et al. | 382/118 |
| 2004/0193894 A1 * | 9/2004 | Chaudhari et al. | 713/186 |
| 2005/0196017 A1 * | 9/2005 | Altherr et al. | 382/103 |
| 2005/0271273 A1 | 12/2005 | Blake et al. | |
| 2005/0276446 A1 * | 12/2005 | Chen et al. | 382/103 |
| 2007/0031037 A1 | 2/2007 | Blake et al. | |
| 2007/0122039 A1 * | 5/2007 | Zhang et al. | 382/199 |
| 2007/0192100 A1 * | 8/2007 | Rosec et al. | 704/246 |
| 2007/0237393 A1 | 10/2007 | Zhang et al. | |
| 2008/0304735 A1 * | 12/2008 | Yang et al. | 382/164 |
| 2009/0110236 A1 * | 4/2009 | Huang et al. | 382/103 |
| 2009/0196349 A1 * | 8/2009 | Park et al. | 375/240.12 |
| 2010/0104018 A1 * | 4/2010 | Bregler et al. | 375/240.16 |
| 2010/0119147 A1 * | 5/2010 | Blake et al. | 382/164 |
| 2010/0172587 A1 * | 7/2010 | Hwang et al. | 382/190 |

OTHER PUBLICATIONS

Eric Thu "Adaptive Background Mixture Models for Real-Time Tracking" Mar. 30, 2007, pp. 45.*
Knowledge-based video indexing for road surveillance.
Track and cut-simultaneous tracking and segmentation of multiple objects with grapg cuts.

* cited by examiner

*Primary Examiner* — Mek Bekele
(74) *Attorney, Agent, or Firm* — CKC & Partners Co., Ltd.

(57) ABSTRACT

A method for foreground detection using multi-modality fusion graph cut includes the following steps. A video frame of a video sequence is inputted. A foreground region in the video frame is designated using adaptive background Gaussian Mixture Model and a threshold value. The foreground region is segmented using a multi-modality fusion graph cut procedure. A computer program product using the method and a system for foreground detection using multi-modality fusion graph cut are also disclosed herein.

18 Claims, 5 Drawing Sheets

METHOD AND SYSTEM FOR FOREGROUND DETECTION USING MULTI-MODALITY FUSION GRAPH CUT

RELATED APPLICATIONS

This application claims priority to Taiwan Application Serial Number 98104859, filed Feb. 16, 2009, which is herein incorporated by reference.

BACKGROUND

1. Field of Invention

The present invention relates to a method and system for foreground detection. More particularly, the present invention relates to a method and system for foreground detection using multi-modality fusion graph cut.

2. Description of Related Art

Currently available methods for performing the foreground region and background region segmentation on the video sequence obtained from a static camera include the following three:

The first method uses the frame difference. The absolute values for each of the pixels in the adjacent video frames of a video sequence (for example, the video frames at the $1^{st}$ second and the $2^{nd}$ second) are calculated. Assume that the greater the absolute value is, the more likely it is to be the foreground object. Thus, a threshold value may be set to determine the foreground objects. However, the shortcoming of this approach is that it is not appropriate for processing foreground objects that might stop at some point since there is no background model constructed beforehand. For example, if a person sitting in a chair is talking on the phone, the differences between adjacent images will be very small. It will be difficult to separate the foreground region from the background region, and thus this method will not apply.

The second method uses a single Gaussian distribution to construct the background model. This method requires a video sequence that is long enough. For the changes of each pixel during this time period, use single Gaussian probability distribution to construct a background model. Then, the new incoming frame is compared with the background model. If the similarity degree of the pixels compared is lower than a threshold value, these pixels will be considered as the foreground region. However, the shortcoming of this approach is that the changes in the video sequence need to have sufficient strength, so it may not be able to deal with non-static backgrounds. For example, when the camera is set up in the outdoors, the captured video sequences are often dynamic. The shadow of the building moves or changes over time. The outdoor water continues to have the water movement. Light changes to brighter or darker. These backgrounds change over time, and this method is not appropriate for them.

The third method uses an adaptive Gaussian Mixture Model to construct the background model. This method uses multiple sets of Gaussian distribution to model the background. Moreover, the background model may change with the incoming video frame for comparison. For example, one model is used during the day, and another model is used during the evening. Thus, the model is adaptive and able to overcome small changes in the background such as indoor to outdoor light. However, the shortcoming of this approach is that each pixel is regarded as independent, and the relationship between adjacent pixels are not taken into account. Therefore, this method is not appropriate when the foreground is similar to the background. For example, if the camera is set up in an surrounding that is not good for the surveillance camera, or the foreground object is very similar to the background, confusion might happen when this algorithm performs the segmentation. For instance, the color of the foreground clothing is so very similar to the background color that the foreground clothing is regarded as the background.

Therefore, there is a need to provide a method for foreground detection to improve the aforementioned shortcomings.

SUMMARY

The objective of the present invention is to provide a method and system for foreground detection using multi-modality fusion graph cut. When the foreground region is similar to the background region, the foreground may be separated from the background region successfully. This invention enhances the completeness of the obtained foreground region.

According to one embodiment of the present invention, a method for foreground detection using multi-modality fusion graph cut includes the following steps: A video frame of a video sequence is inputted. A foreground region in the video frame is designated using adaptive background Gaussian Mixture Model and a threshold value. The foreground region is segmented using a multi-modality fusion graph cut procedure.

According to another embodiment of the present invention, a system for foreground detection using multi-modality fusion graph cut includes a saving means, a comparing means, and a model update means. The saving means is for saving the information regarding each object block using the adaptive background Gaussian Mixture Model. The comparing means is for comparing each object block with the adaptive background Gaussian Mixture Model. The model update means is for updating the adaptive background Gaussian Mixture Model or generating another adaptive background Gaussian Mixture Model according to the trend of a change when the adaptive background Gaussian Mixture Model detects the change.

According to yet another embodiment of the present invention, a computer program product including program codes for executing the following steps. A video frame of a video sequence is inputted. A foreground region in the video frame is designated using adaptive background Gaussian Mixture Model and a threshold value. The foreground region is segmented using a multi-modality fusion graph cut procedure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the embodiment of this invention, examples of which are illustrated in the accompanying drawings. Wherever possible, the same reference numbers are used in the drawings and the description to refer to the same or like parts.

Figure 1:
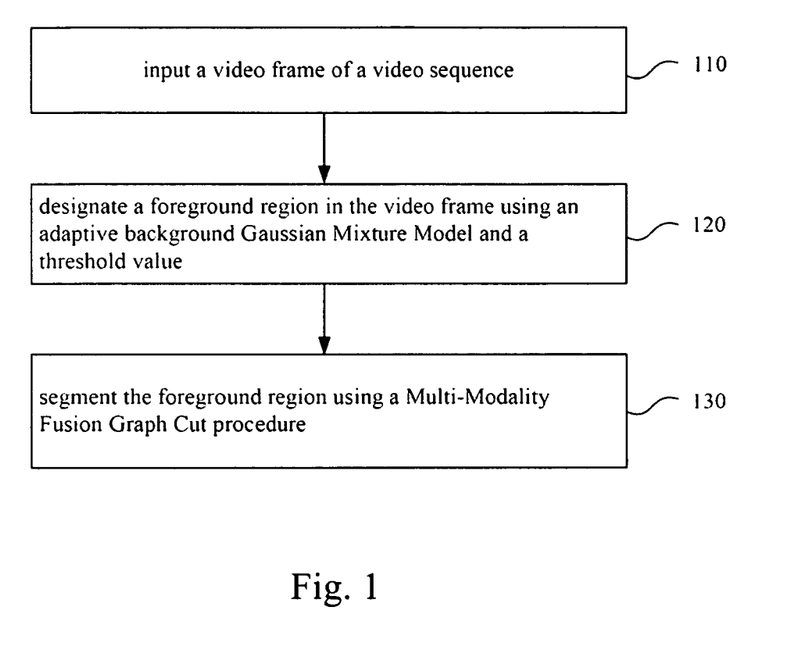
FIG. 1 is a flow chart illustrating a method for foreground detection using multi-modality fusion graph cut according to one embodiment of the present invention.

Please refer to FIG. 1, which is a flow chart illustrating a method for foreground detection using multi-modality fusion graph cut according to one embodiment of this invention. In another embodiment of this invention, a computer program product may perform various steps of this method with program codes. This method includes the following steps. (It should be understood that the order of steps involved in this embodiment may be adjusted according to the actual practices. The steps or part of the steps may be performed simultaneously.)

(1) Input a video frame of a video sequence (step 110). A video sequence may include a sequence of video frames. In this embodiment, the foregrounds in these video frames may be detected respectively.

Figure 2:
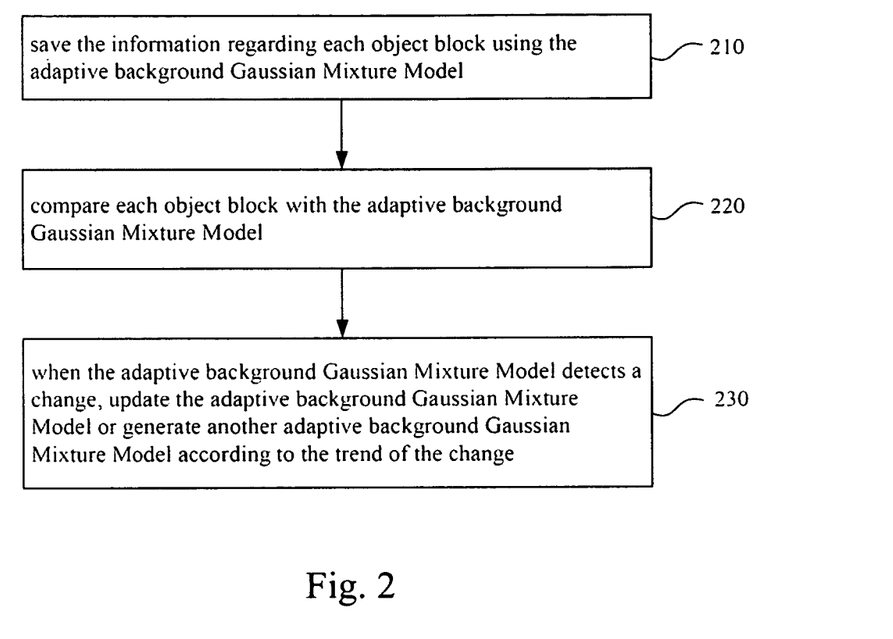
FIG. 2 is a flow chart illustrating the detailed steps included in step 120 designating a foreground region in the video frame using an adaptive background Gaussian Mixture Model and a threshold value as shown in the embodiment in FIG. 1.

(2) Designate a foreground region in the video frame using an adaptive background Gaussian Mixture Model (GMM) and a threshold value, wherein the foreground region comprises at least one object block (step 120). A rough foreground region may be obtained by using an adaptive background Gaussian Mixture Model and an appropriate threshold value. In one embodiment, a user may designate the foreground region by operating an appropriate image-processing device manually. In another embodiment, the foreground region may be designated automatically by configuring an image-processing device in advance. Next, in order to enhance the rough foreground segmentation result, the connected components in the designated foreground region may be put into blocks. That is, the foreground region may be divided into a plurality of object blocks first, and the object blocks may be processed respectively. Please refer to FIG. 1 and FIG. 2. FIG. 2 is a flow chart illustrating the detailed steps included in step 120 designating a foreground region in the video frame using an adaptive background Gaussian Mixture Model and a threshold value as shown in the embodiment in FIG. 1. By using a tracking technique, the steps below may enhance the precision of box bounding the connected components in the foreground region:

(2.1) The information regarding each object block is saved using the adaptive background Gaussian Mixture Model (step 210). The information regarding each object block may include color histogram distribution, speed, orientation, size and location.

(2.2) Each object block is compared with the adaptive background Gaussian Mixture Model (step 220). For each new incoming video frame, a rough foreground region is designated by box bounding the connected components first. Then, each object block is compared with the existing adaptive background Gaussian Mixture Model.

(2.3) When the adaptive background Gaussian Mixture Model detects a change, the adaptive background Gaussian Mixture Model or generating another adaptive background Gaussian Mixture Model is updated according to the trend of the change (step 230). After the comparison at step 220 is done, if the comparison result has high similarity, the block is regarded as the same. If the comparison result has no similarity and there are objects showed up in unusual locations, then the change is regarded as generated by noise. If the object shows up in the place where it should show up (such as when the object just enters the scene), a new model will be generated to save information regarding the object. If the existing model suddenly detects a big change (such as the original object block is broken into many pieces), then the model will confirm the change in a time buffer. Several video frames will be observed first to see whether the object really has this trend of change. If it does, the model is updated (such as breaking into many models). Otherwise, the change is regarded as generated by noise. Here a Kalman Filter may be used to update the adaptive background Gaussian Mixture Model. This step may greatly reduce errors occurred in a detection phase.

Figure 3:
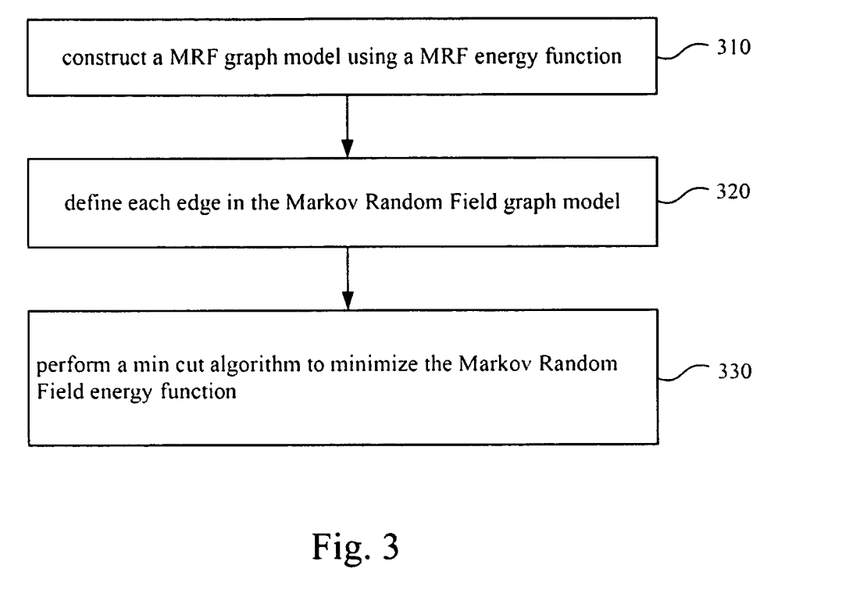
FIG. 3 is a flow chart illustrating the detailed steps included in step 130 segmenting the foreground region using a Multi-Modality Fusion Graph Cut procedure as shown in the embodiment in FIG. 1.

(3) The foreground region is segmented using a Multi-Modality Fusion Graph Cut procedure (step 130). For each object block included in the foreground region, the foreground segmentation result may be improved after the Multi-Modality Fusion Graph Cut procedure is performed. FIG. 3 is a flow chart illustrating the detailed steps included in step 130 segmenting the foreground region using a Multi-Modality Fusion Graph Cut procedure as shown in the embodiment in FIG. 1:

(3.1) A Markov Random Field (MRF) graph model is constructed using a Markov Random Field energy function (step 310). In this embodiment, multiple models (such as GMM likelihood term, appearance likelihood term, and prior constraint likelihood term) are integrated into the energy function to construct the Markov Random Field graph model (a graph model commonly used in graph cut). Therefore, an improved segmentation result is obtained. This method is dubbed as "multi-modality fusion graph cut".

(3.2) Each edge in the Markov Random Field graph model is defined (step 320). For example, an edge (or energy) may be defined according to the relationship between the edge and the connected nodes.

(3.3) A min cut algorithm is performed to minimize the Markov Random Field energy function (step 330). After the min solution of the Markov Random Field energy function is obtained for each object block, each object block will be put back into the original video frame. Then, the improved foreground segmentation result is obtained.

In this embodiment, the adjacent spatial relationship is factored in. Conventional segmentations are by pixel only, so the relationship between the adjacent pixels is not considered. This approach does not reflect the real situation. Thus, broken objects are often present in the obtained foreground region. This problem is improved in the above embodiment.

Furthermore, in this embodiment, the foreground region is divided into small object blocks, and these object blocks are processed respectively. Finally, the results obtained from each block are combined. The strength of dividing the foreground region into small object blocks is that it is easier to factor in the prior constraint of objects. Since each of the object blocks may be regarded as an independent part, parallel computation with multi-core may be used to accelerate the computing speed and achieve the implementation of real-time system.

The energy function used in this embodiment is described below. Total energy E consists of date term H and smooth term G:

$$E(x) = \sum_{v \in V} H(x_v) + \lambda \sum_{(u,v) \in E} G(x_u, x_v)$$

The data term H consists of GMM likelihood term ($L_{GMM}$), appearance likelihood term ($L_{Appearance}$), and prior constraint likelihood term ($L_{Constraint}$). These terms are independent, and multi-core parallel processing may be used to accelerate the computation.

$$H(x_i) = (1-\tau)L_{GMM} + \tau L_{Appearance} + \delta L_{Constraint}$$

The smooth term consists of appearance likelihood term ($L_{Appearance}$) and GMM likelihood term ($L_{GMM}$):

$$G(x_u, x_v) = (1-\zeta)L_{Appearance} + \zeta L_{GMM}$$

In the functions listed above, λ, τ, δ, ζ are adjustable parameters. According to the user's needs, a process of parameter learning may be applied to obtain appropriate numbers, and therefore the best result of each case may be achieved.

In the data term H, the GMM likelihood term ($L_{GMM}$) is for the probability of each pixel being determinated as the foreground or background. The Gaussian Mixture Model (GMM) is used as the background model. The current video frame is compared with the background model to determine is whether a pixel is in the foreground, and the obtained probability is called the GMM likelihood. Assume that there are K mixture models:

$$L_{GMM}(x, \text{lable}) = 1/\min_k (|I_x - \mu_k(x)|/\sigma_k(x)), \quad \text{if label} = 1$$
$$= 1 - 1/\min_k (|I_x - \mu_k(x)|/\sigma_k(x)), \quad \text{if label} = 0$$

where $I_x$ stands for the intensity of pixel x, $\mu_k()$ stands for the mean, and $\sigma_k()$ stands for the standard deviation.

For the appearance likelihood term, the rough foreground region is regarded as the known foreground, and the exterior part of the bounding box is regarded as the known background. Then, a background Gaussian Mixture Model and a foreground Gaussian Mixture Model may be obtained. Therefore, the appearance likelihood term ($L_{Appearance}$) can be written as the following:

$$L_{Appearance}(x, \text{lable}) = -\log(P_F(I_x)|\mu_k, \sigma_k)), \quad \text{if label} = 1$$
$$= -\log(P_B(I_x)|\mu_k, \sigma_k)), \quad \text{if label} = 0$$

where $P_F$ stands for the probability of foreground, $P_B$ stands for the probability of background, $I_x$ stands for the intensity of pixel x, $\mu_k()$ stands for the mean, and $\sigma_k()$ stands for the standard deviation.

For the prior constraint likelihood term, there should be a general trend for the object distribution inside the bounding box under normal circumstances. For example, there should not be a hole in a human figure. The center part in the bounding box should have higher probability of being detected as the foreground than the other parts in the bounding box. As a result, the 2D Gaussian density function may be used to model the likelihood of object distribution. In this embodiment, the center of the box is regarded as the mean point. Thus, one sixth of the Height of the box is taken as the first standard deviation σ1, and one sixth of the Width of the box is taken as the second standard deviation σ2. The prior constraint likelihood term ($L_{Constraint}$) can be written as the following:

$$L_{Constraint}(u, v, \text{lable}) = 1 - \log(P(u, v | \sigma_1, \sigma_2)), \quad \text{if label} = 1$$
$$= \log(P(u, v | \sigma_1, \sigma_2)), \quad \text{if label} = 0$$

where u and v are pixel indexes in the image, $1 \leq u \leq \text{Height}$, $1 \leq v \leq \text{Width}$.

The smooth term G is used to deal with the continuity relationship between pixels. Two terms are used here for reference: one is the color of the original image, which is the appearance likelihood term ($L_{Appearance}$). Another is the information obtained from the GMM likelihood, which is the GMM likelihood term ($L_{GMM}$). The smooth term G, appearance likelihood term, and GMM likelihood term can be written as:

$$G(i, j) = (1-\zeta)L_{Appearance} + \zeta L_{GMM}$$

$$L_{Appearance}(i, j) = |x_i - x_j| \cdot \frac{1}{\|I_i - I_j\|^2}$$

$$L_{GMM}(i, j) = |x_i - x_j| \cdot \frac{1}{\|score_i - score_j\|^2}$$

where $I_x$ stands for the intensity of pixel x, $x_x$ stands for the label of pixel x (1 or 0), and $score_x$ stands for the GMM likelihood scores of pixel x.

Figure 4:
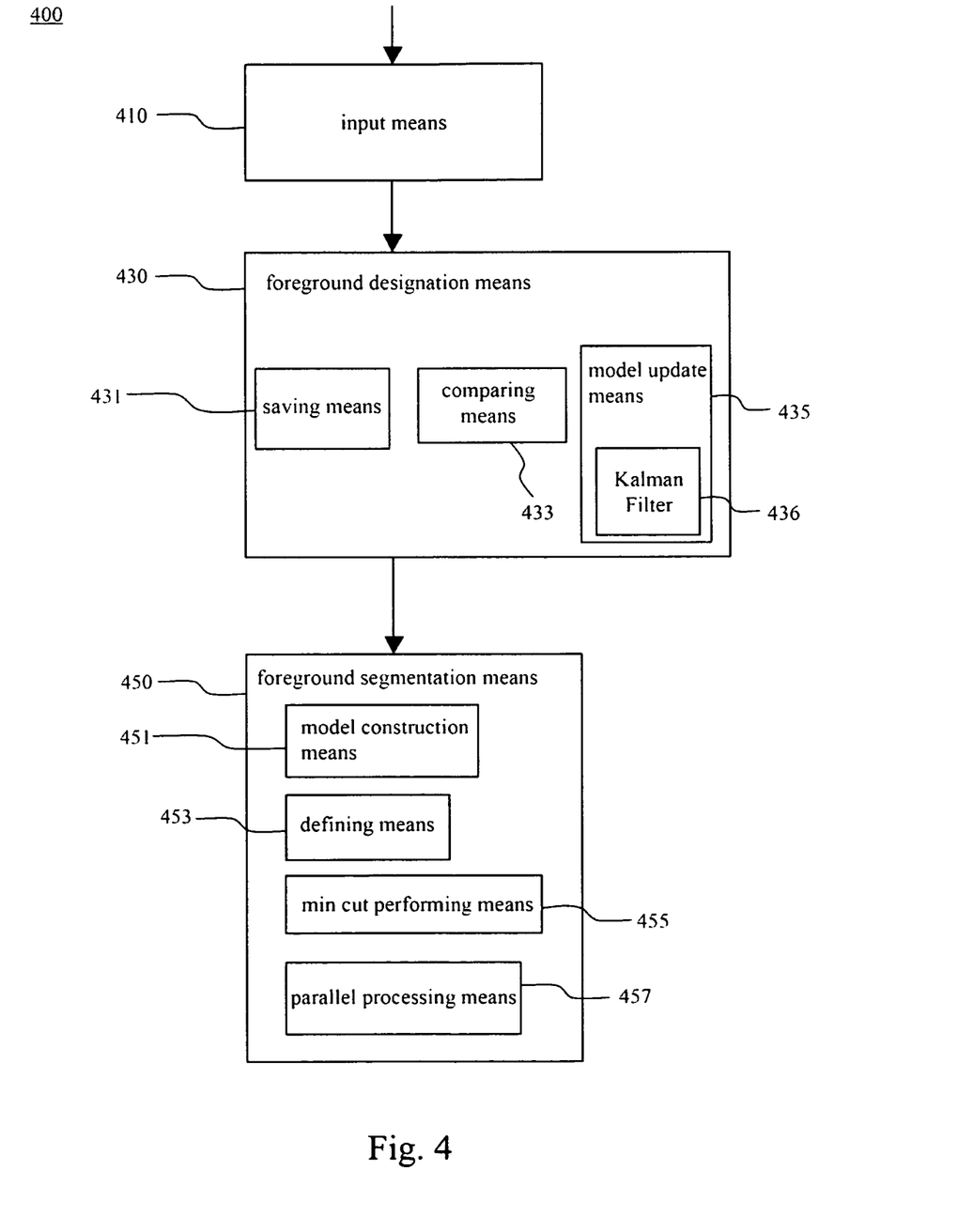
FIG. 4 is a block diagram illustrating a system for foreground detection using multi-modality fusion graph cut according to another embodiment of the present invention.

FIG. 4 is a block diagram illustrating a system for foreground detection using multi-modality fusion graph cut according to another embodiment of this invention. In this embodiment, the foreground detection system 400 includes an input means 410, a foreground designation means 430, and a foreground segmentation means 450. The input means 410 is for inputting a video frame of a video sequence. The foreground designation means 430 is for designating a foreground region in the video frame using an adaptive background Gaussian Mixture Model and a threshold value. The foreground region includes at least one object block. The foreground segmentation means 450 is for segmenting the foreground region using a Multi-Modality Fusion Graph Cut procedure.

Furthermore, the foreground designation means 430 includes a saving means 430, a comparing means 433, and a model update means 435. The saving means 431 is for saving the information regarding each object block using the adaptive background Gaussian Mixture Model. The information regarding each object block includes color histogram distribution, speed, orientation, size and location. The comparing means 433 is for comparing each object block with the adaptive background Gaussian Mixture Model. When the adaptive background Gaussian Mixture Model detects the change, according to the trend of a change, the model update means 435 may update the adaptive background Gaussian Mixture Model or generate another adaptive background Gaussian Mixture Model. The model update means 435 may use a Kalman Filter 436 to update the adaptive background Gaussian Mixture Model.

The foreground segmentation means 450 may include a model construction means 451, a defining means 453, and a min cut performing means 455. The model construction means 451 is for constructing a Markov Random Field graph model using a Markov Random Field energy function. The defining means 453 is for defining each edge in the Markov Random Field graph model. The min cut performing means 455 is for performing a min cut algorithm to minimize the Markov Random Field energy function.

Figure 5:
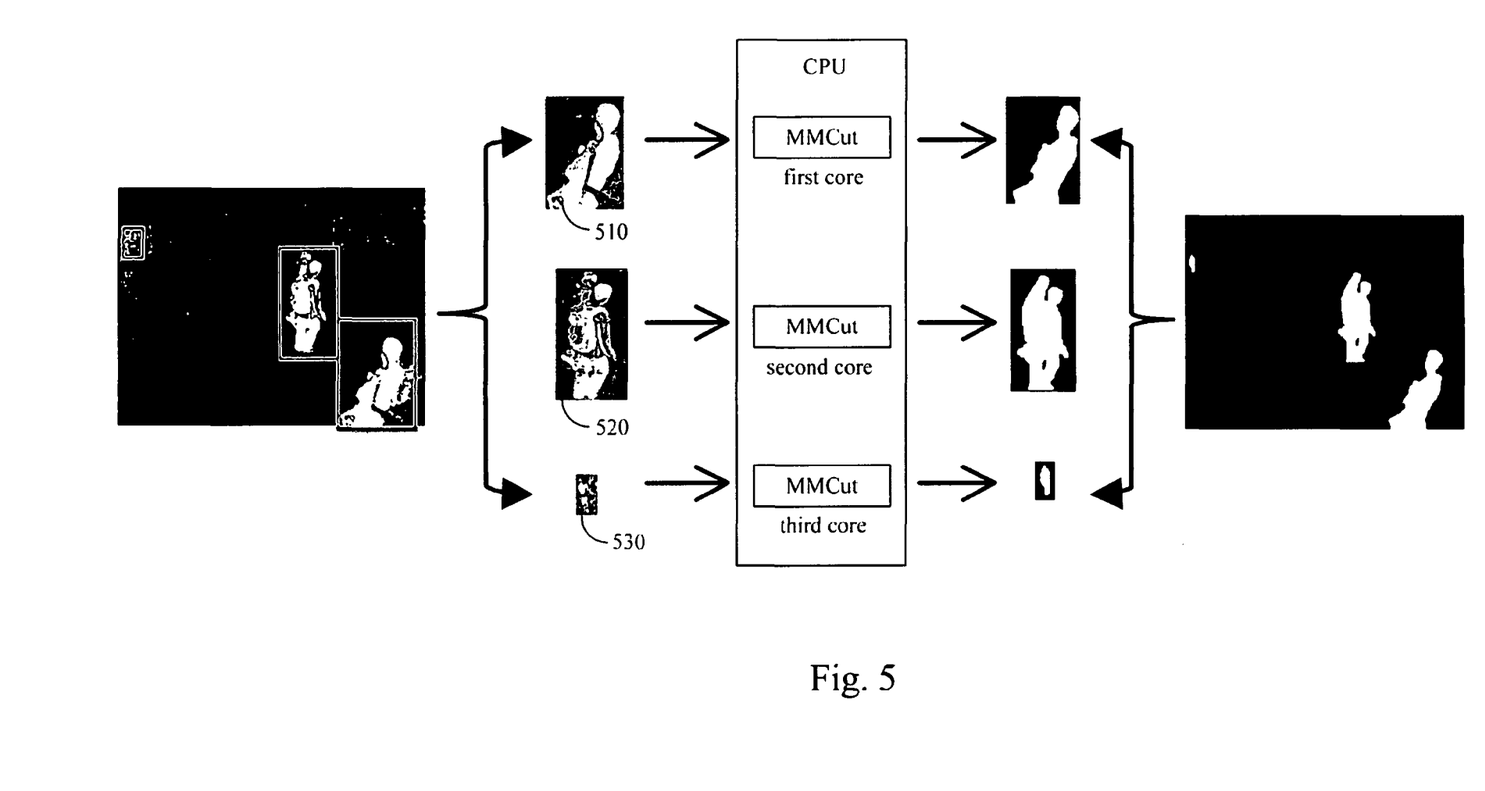
FIG. 5 is a diagram illustrating processing the object block in parallel according to another embodiment of the present invention.

The foreground segmentation means 450 may process the object blocks with single-core or multi-core. Thus, the foreground segmentation means 450 may include a parallel processing means 457 for processing the object block in parallel using the Multi-Modality Fusion Graph Cut procedure. FIG. 5 is a diagram illustrating processing the object block in parallel according to another embodiment of this invention. In this embodiment, the foreground region includes three object blocks 510-530. Since the object blocks are processed in parallel with multi-core, the job load may be spread evenly to each CPU to save time. Finally, each of the processed object blocks is put back into the original video frame, and the improved foreground segmentation result is achieved.

From the embodiments of this invention described above, the method and system for foreground detection using multi-modality fusion graph cut have the following strength. When this invention is applied to static surveillance cameras, the foreground may be successfully separated from the background region without having broken objects even if the foreground and the background are similar. This invention enhances the completeness of the foreground region.

It will be apparent to those skilled in the art that various modifications and variations can be made to the structure of the embodiment without departing from the scope or spirit of the invention. In view of the foregoing, it is intended that the embodiment cover modifications and variations of this invention provided they fall within the scope of the following claims and their equivalents.

What is claimed is:

1. A method for foreground detection using multi-modality fusion graph cut comprising the following steps:
    inputting a video frame of a video sequence;
    designating a foreground region in the video frame using an adaptive background Gaussian Mixture Model and a threshold value, wherein the foreground region comprises at least one object block, furthest comprising:
        saving the information regarding each object block using the adaptive background Gaussian Mixture Model;
        comparing each object block with the adaptive background Gaussian Mixture Model; and
        updating the adaptive background Gaussian Mixture Model or generating another adaptive background Gaussian Mixture Model according to the trend of a change when the adaptive background Gaussian Mixture Model detects the change; and
    segmenting the foreground region using a Multi-Modality Fusion Graph Cut procedure.

2. The method of claim 1, wherein the information regarding each object block comprises color histogram distribution, speed, orientation, size, and location.

3. The method of claim 1, wherein the step of updating the adaptive background Gaussian Mixture Model comprises the following step:
    updating the adaptive background Gaussian Mixture Model using a Kalman Filter.

4. The method of claim 1, wherein the step of segmenting the foreground region using a Multi-Modality Fusion Graph Cut procedure comprises the following step:
    processing the object block in parallel using the Multi-Modality Fusion Graph Cut procedure.

5. The method of claim 1, wherein the step of segmenting the foreground region using a Multi-Modality Fusion Graph Cut procedure comprises the following step:
    constructing a Markov Random Field (MRF) graph model using a Markov Random Field energy function;
    defining each edge in the Markov Random Field graph model; and
    performing a min cut algorithm to minimize the Markov Random Field energy function.

6. The method of claim 5, wherein the Markov Random Field energy function comprises:
    a data term comprising:
        a GMM likelihood term, an appearance likelihood term, and a prior constraint likelihood term; and
    a smooth term comprising:
        a GMM likelihood term and an appearance likelihood term.

7. A system for foreground detection using multi-modality fusion graph cut comprising:
    an input means for inputting a video frame of a video sequence;
    a foreground designation means for designating a foreground region in the video frame using an adaptive background Gaussian Mixture Model and a threshold value, wherein the foreground region comprises at least one object block, further comprising:
        a saving means for saving the information regarding each object block using the adaptive background Gaussian Mixture Model;
        a comparing means for comparing each object block with the adaptive background Gaussian Mixture Model; and
        a model update means for updating the adaptive background Gaussian Mixture Model or generating another adaptive background Gaussian Mixture Model according to the trend of a change when the adaptive background Gaussian Mixture Model detects the change; and
    a foreground segmentation means for segmenting the foreground region using a Multi-Modality Fusion Graph Cut procedure.

8. The system of claim 7, wherein the information regarding each object block comprises color histogram distribution, speed, orientation, size and location.

9. The system of claim 7, wherein the model update means comprises a Kalman Filter for updating the adaptive background Gaussian Mixture Model.

10. The system of claim 7, wherein the foreground segmentation means comprises a parallel processing means for processing the object block in parallel using the Multi-Modality Fusion Graph Cut procedure.

11. The system of claim 7, wherein the foreground segmentation means comprises:
    a model construction means for constructing a Markov Random Field (MRF) graph model using a Markov Random Field energy function;
    a defining means for defining each edge in the Markov Random Field graph model; and
    a min cut performing means for performing a min cut algorithm to minimize the Markov Random Field energy function.

12. The system of claim 11, wherein the Markov Random Field energy function comprises:
  a data term comprising:
    a GMM likelihood term, an appearance likelihood term, and a prior constraint likelihood term; and
  a smooth term comprising:
    a GMM likelihood term and an appearance likelihood term.

13. A non-transitory computer-readable medium comprising program codes for executing the following steps:
  inputting a video frame of a video sequence;
  designating a foreground region in the video frame using an adaptive background Gaussian Mixture Model and a threshold value, wherein the foreground region comprises at least one object block, further comprising:
    saving the information regarding each object block using the adaptive background Gaussian Mixture Model;
    comparing each object block with the adaptive background Gaussian Mixture Model; and
    updating the adaptive background Gaussian Mixture Model or generating another adaptive background Gaussian Mixture Model according to the trend of a change when the adaptive background Gaussian Mixture Model detects the change; and
  segmenting the foreground region using a Multi-Modality Fusion Graph Cut procedure.

14. The non-transitory computer-readable medium of claim 13, wherein the information regarding each object block comprises color histogram distribution, speed, orientation, size and location.

15. The non-transitory computer-readable medium of claim 13, wherein the step of updating the adaptive background Gaussian Mixture Model comprises the following step:
  updating the adaptive background Gaussian Mixture Model using a Kalman Filter.

16. The non-transitory computer-readable medium of claim 13, wherein the step of segmenting the foreground region using a Multi-Modality Fusion Graph Cut procedure comprises the following step:
  processing the object block in parallel using the Multi-Modality Fusion Graph Cut procedure.

17. The non-transitory computer-readable medium of claim 13, wherein the step of segmenting the foreground region using a Multi-Modality Fusion Graph Cut procedure comprises the following step:
  constructing a Markov Random Field (MRF) graph model using a Markov Random Field energy function;
  defining each edge in the Markov Random Field graph model; and
  performing a min cut algorithm to minimize the Markov Random Field energy function.

18. The non-transitory computer-readable medium of claim 17, wherein the Markov Random Field energy function comprises:
  a data term comprising:
    a GMM likelihood term, an appearance likelihood term, and a prior constraint likelihood term; and
  a smooth term comprising:
    a GMM likelihood term and an appearance likelihood term.

* * * * *